March 1, 1927.

H. H. STEELE 1,619,160

EDUCATIONAL DEVICE FOR TEACHING SPELLING

Filed Jan. 21, 1924    4 Sheets-Sheet 1

Inventor
Herbert H. Steele.

March 1, 1927. 1,619,160
H. H. STEELE
EDUCATIONAL DEVICE FOR TEACHING SPELLING
Filed Jan. 21, 1924 4 Sheets-Sheet 2
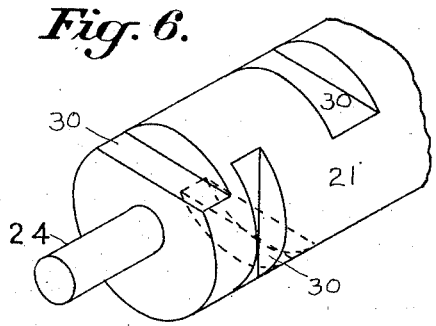
Fig. 6.
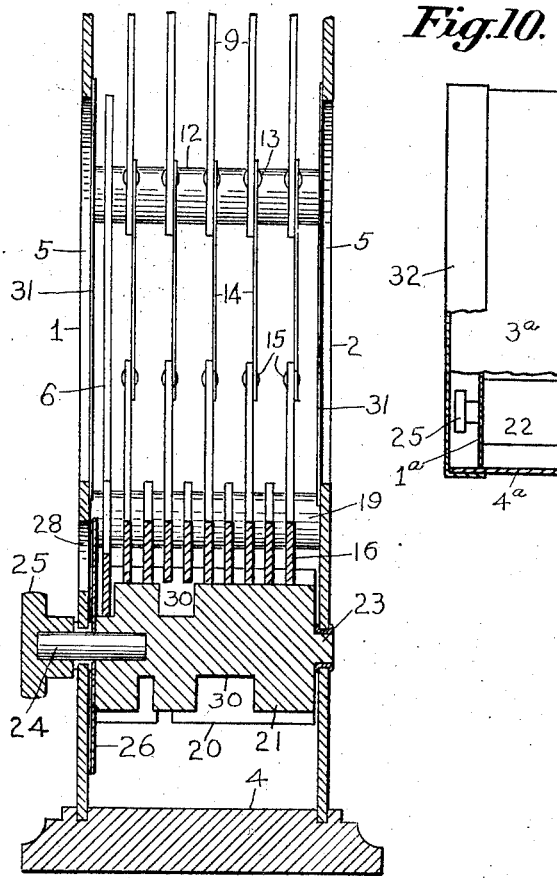
Fig. 3.
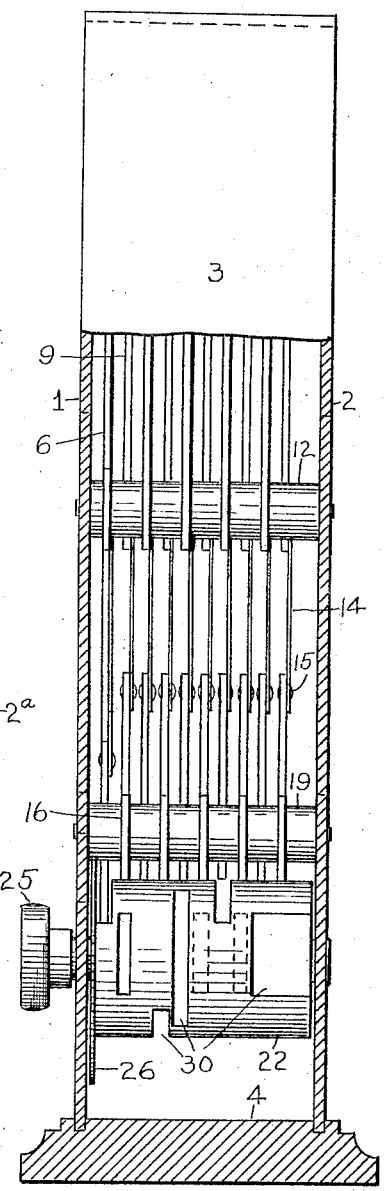
Fig. 2.
Fig. 10.
Inventor
Herbert H. Steele.

March 1, 1927.

H. H. STEELE 1,619,160

EDUCATIONAL DEVICE FOR TEACHING SPELLING

Filed Jan. 21, 1924     4 Sheets-Sheet 3

Inventor
Herbert H. Steele.

March 1, 1927.

H. H. STEELE 1,619,160

EDUCATIONAL DEVICE FOR TEACHING SPELLING

Filed Jan. 21, 1924    4 Sheets-Sheet 4

Inventor
Herbert H. Steele.

Patented Mar. 1, 1927.

1,619,160

UNITED STATES PATENT OFFICE.

HERBERT H. STEELE, OF LYNBROOK, NEW YORK.

EDUCATIONAL DEVICE FOR TEACHING SPELLING.

Application filed January 21, 1924. Serial No. 687,638.

My invention relates to improvements in educational devices in which a series of normally invisible pictured targets are operated by a series of lettered disks to expose a picture when the letters of the dials register to spell the picture.

The object of this invention is to improve and simplify the construction and operation of an educational device shown and described in my prior patent dated June 20th, 1905, No. 792,801, where a series of detached lettered blocks were employed to expose a picture when the blocks were arranged to spell the picture. These blocks were a source of many troubles; they were expensive to make, easily lost and easily broken from being left upon the floor and stepped upon. Furthermore, the pictured targets were spring-pressed in the direction of exposure and the co-operative levers that controlled the targets, were operated by springs working contrawise to the springs of the targets and to properly adjust these two opposing spring elements and maintain a degree of friction to hold the blocks within their slots, was a tedious assembling operation and the springs easily got out of adjustment; and hence, one object of this invention is to design a controlling mechanism for the pictured targets, that shall be free of springs of any nature; the targets being arranged to drop by gravity for exposure and the controlling means having only to overcome this light gravitative action. Another object, is to provide a complete unit where every part is permanently assembled to or within the enclosing case; and a further object is to provide a casing to suitably enclose the various mechanisms in such a manner, that by the addition of a cover-piece, a complete shipping unit is formed to save the expense of a separate box to enclose the invention for commercial purposes.

I attain these objects by the mechanisms and methods illustrated in the accompanying drawings, in which—

Figure 2, is a right hand side elevation with the lower portion of the case broken away.

Figure 3, is a central vertical section through the case.

Figure 6, is an enlarged view of one of the controlling cylinders shown in perspective to illustrate the transverse slots therethrough.

Figure 10, is a reduced end view, partly in section, of a modified form of the case where a cover is provided to form a complete shipping unit.

Figure 1:
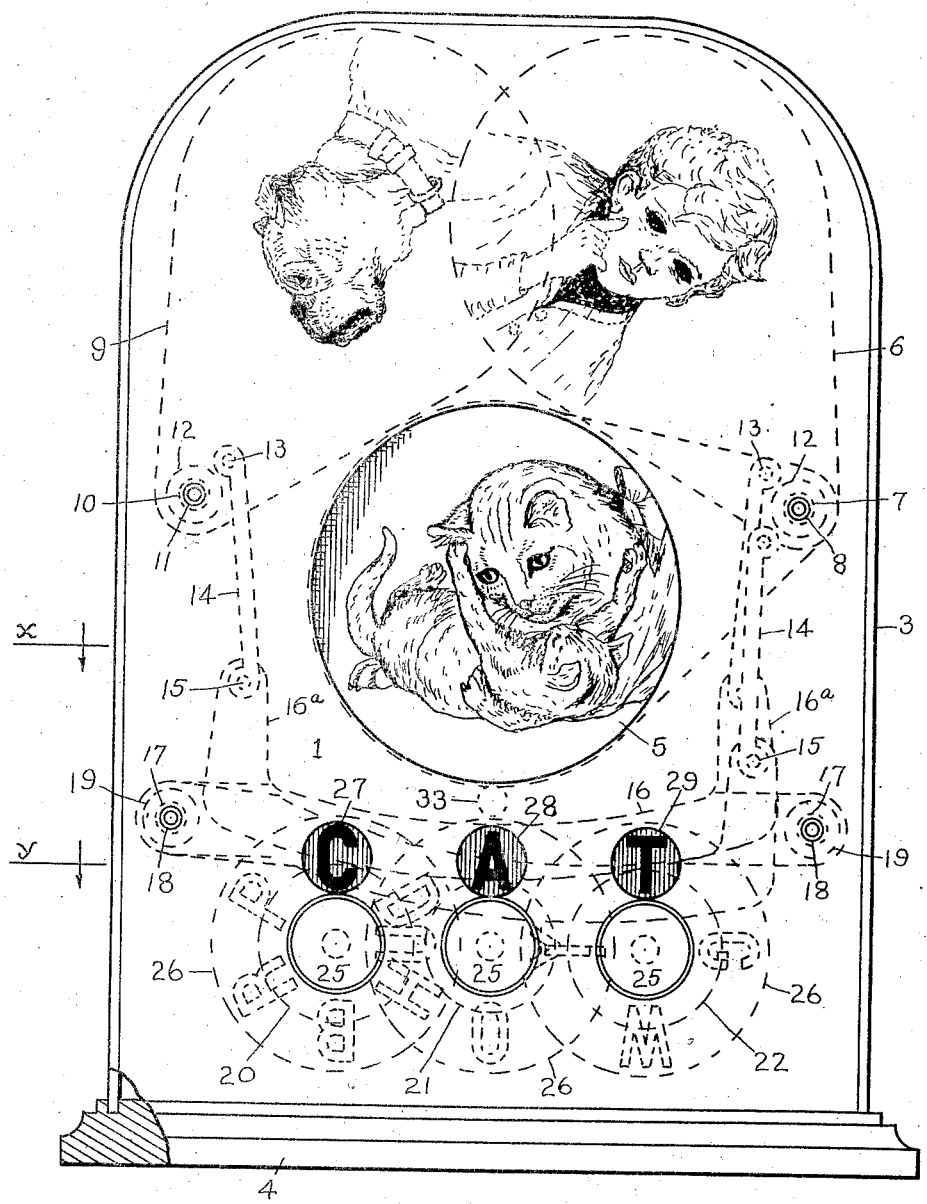
Figure 1, is a full size front elevation of my invention with the picture of a cat exposed and the letters that spell cat, registering at their respective indexing holes.
Figure 4:
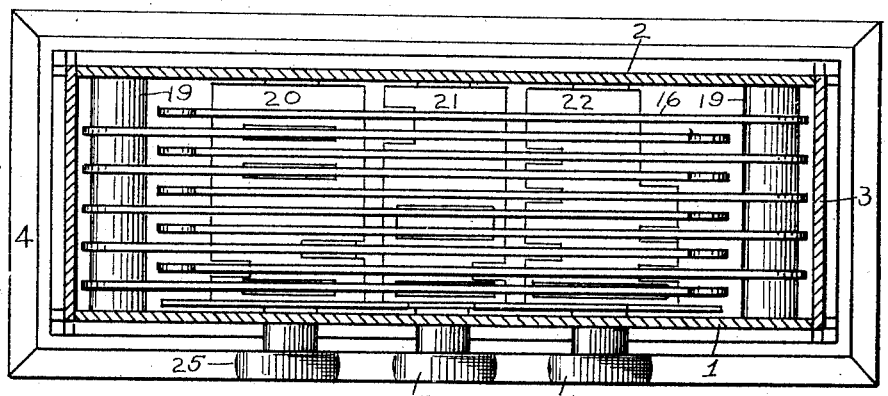
Figure 4, is a horizontal section through the case on a plane indicated by the line X, Figure 1.
Figure 5:
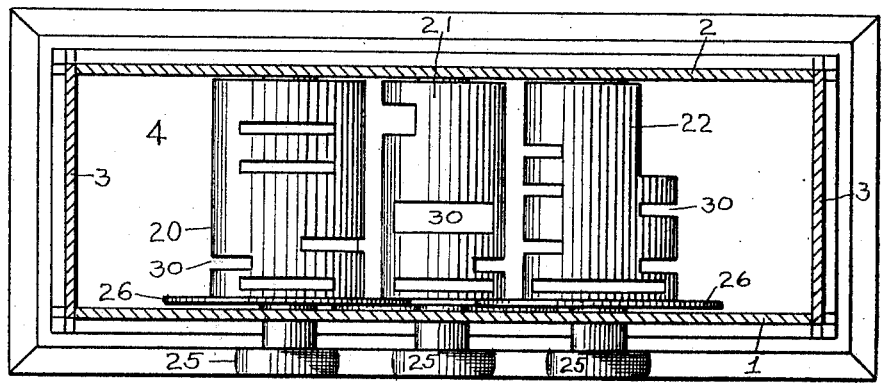
Figure 5, is a horizontal section through the case on a plane indicated by the line Y, Figure 1.
Figure 7:
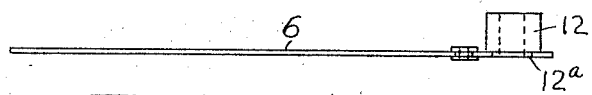
Figure 7, is a detail view of one of the targets.

The casing comprises three pieces of cardboard, 1 the front face, 2 the rear face or back and 3 a single piece that forms the two sides and top of the case and provides for an open bottom. The edges where these three pieces join, may be bound together in any wellknown box-making method. A wooden base 4, may be grooved on four sides as with a saw-cut and the edges of the open end of the case set therein and glued permanently.

Both the front and back walls of the case are formed with a central circular opening 5 that are in alinement with each other.

A series of light cardboard wings or targets 6, are arranged above and to the right of the opening 5 and the whole series are pivotally mounted upon a rod 7 that defines a radial path for the targets relative to the opening 5. This rod 7 may be shouldered down at each end to enter eyeletted holes in both the front and back pieces 1 and 2.

A similar series of targets 9 are arranged above and to the left hand of the opening 5 and similarly mounted upon a rod 10 that engages within eyeletted holes 11.

One series of targets in vertical relation to the other series, is staggered, so that their path to and from the opening 5 will be midway between the planes of the other series and avoid interference with each other, as shown at Figure 2.

Each target 6 or 9 is provided with a hub 12 that may be reduced at one end to form a shoulder and the reduced part 12$^a$ passed through a hole in the target and glued thereto, thus providing each target with a comparatively long bearing to prevent wabbling and also to serve as spacers between adjoining targets. Each target 6 or 9 is provided with a small eyeletted hole 13, that serves as a pivotal point for one end of a metal link 14. The opposite end of this link is pivoted in a similar manner at 15 to the free end of a horizontally disposed lever 16. These levers 16 are all alike in form and size and are grouped into two series; each series being equal in number to its series of targets; and each series are pivotally mounted upon a rod 17 that is shouldered at each end to enter eyeletted hole 18 in both front and back pieces 1 and 2. Each lever is provided with a hub 19 and they are so positioned relative to each other that the said lever will aline vertically with its associated target. The free end of the levers 16 being directly under its associated target, the pivotal end must necessarily be at the opposite side of the case, as shown; and to avoid conflict, must be staggered in relation to each other and the free ends must clear the hubs of the other series and to avoid interference at the pivots 15, the free ends of the levers extend upwardly at practically right angles, as indicated at 16$^a$, so that the down position of the connection 15 as shown in dotted lines at Figure 1, will stand above the plane of the adjoining series of levers.

From this description, it will be seen that both targets 6 and 9 and their levers 16 are subject to the force of gravity when the case stands upright in operative position. To check or control this gravitative effect when not desired, a series of three cylinders 20, 21 and 22 are arranged adjacent the center of the case and at right angles to the plane of the levers 16, so that the under edge of all the levers of both series will bear against the periphery of all three cylinders when their associated targets are raised to their invisible or normal position above the opening 5. These cylinders are preferably made of wood for lightness, with one end reduced to pivotal form as at 23 to take bearings within eyeletted holes in the rear wall 2 of the case. The opposite end of these cylinders may be bored centrally for a pivot rod 24 that takes a bearing within eyeletted holes in the front wall 1 and terminates at a finger piece or knob 25, which enables each cylinder being turned freely in either direction. Each cylinder 20, 21 and 22 is provided with a disk or dial of cardboard 26, that may be permanently secured to the end adjacent the inside of the front wall 1. The opposite face of this disk 26 has a series of letters printed thereon radially to the axis of the cylinder and to render one letter of each disk visible, a hole 27, 28 and 29 is punched through the front wall 1 directly over the position of each knob 25.

To co-operate with the levers 16, each cylinder 20, 21 and 22 is formed with a series of transverse slots or grooves 30. These grooves or slots are positioned to aline with the position of the levers and each cylinder will have slots which at some setting thereof will present some slot for every lever-position and hence when the cylinders are turned to a predetermined position defined by the registry of the letters at the holes 27, 28 and 29, a slot on each cylinder will be brought into alinement with a lever 16 and into alinement with each other across the top face of all three cylinders and the said lever will drop by gravity into all three slots and in dropping will permit the connected target to drop to the opening 5 and expose its picture. This dropping feature of the lever within the slots of the cylinders is shown in dotted lines at Figure 1 and diagrammatically at Figure 8 for the position of the parts for a cat picture.

To properly control the movement of the targets through the co-operation of the levers 16 with the three cylinders 20, 21 and 22, the said levers should contact with the top face of all three cylinders, otherwise, if a lever rode high upon one cylinder and did not touch the two adjoining cylinders, this one high cylinder would cause the lever to vibrate slightly and expose the edge of its target at the opening every time the slot in the cylinder was turned into alinement therewith. It is also essential that the depth of the slots 30 in all three cylinders shall be approximately correct for the lever's downward movement, that only the correct letter may be exposed at the holes 27, 28 and 29 as for example; if the cylinder 20 in Figure 9 instead of having a shallow slot as shown, had a deeper slot as indicated by the dotted line 34 which indicates the same depth as the slot in the cylinder 22, it will be seen that the said cylinder 20 could be rotated in either direction until the edges of the slot engaged the lower edge of the lever 16 and this free movement of the said cylinder would be sufficient to wholly expose three letters at the hole 27.

In the drawings, five targets comprise each series 6 and 9 and each target is illustrated by a different three-letter object. These ten objects illustrated are cow, pig, dog, hat, rat, cat, boy, bag, rug and bug. This combination requires six different first letters for these words—C, P, R, B, H, and D, and these six letters are disposed radially around the disk on the cylinder 20. The middle letters for these words are four in number, A, I, O and U and are printed on the face of the disk 26 for the middle cylinder 21. The last letters of the words are also four in number, T, Y, W and G for the disk on the cylinder 22. There being six letters for the cylinder 20, and each letter indicating a stop position for the cylinder, it will be understood that the slots 30 associated with this cylinder will occupy six different planes or at 60 degree divisions of the circumference of the cylinder. The cylinders 21 and 22 having four stop-positions will have their slots 30 on four sides or 90 degrees apart. This detail is illustrated in perspective at Figure 6 which shows a portion of the cylinder 21.

Figure 9:
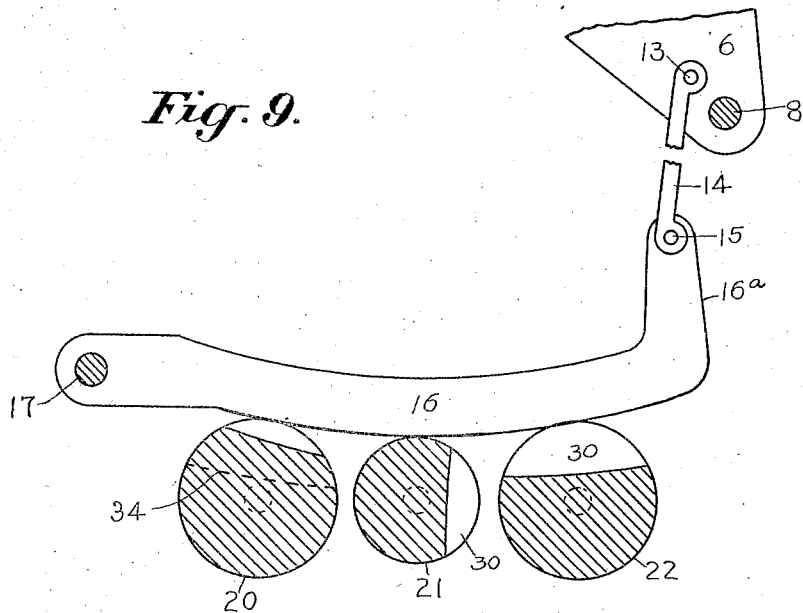
Figure 9, is a view similar to Figure 8, except that the target is at the normal or invisible position.

If the reading of the registry of the letters at the holes 27, 28 and 29 was C-U-T instead of C-A-T, the position of the slots 30 relative to the cat-lever 16 is shown at Figure 9 where the lever 16 and its target 6 are shown in their normal position and while the slots 30 in the two cylinders 20 and 22 are in operative position to permit the dropping of the lever 16, to expose the target, the "U" registry for the cylinder 21, as shown at Figure 9, still prevents the said lever from dropping because the lower edge rides upon the periphery of the cylinder.

From this description it will be seen that the registry of a letter at the holes 27, 28 and 29 constitutes a visible means to index the position of the slots 30 in the cylinders that are themselves hidden from view; that the indexing of the letters on each dial 26 sets up invisible combinations and that these combinations control the movement of the whole series of targets, either to hold them in a state of rest or to drop them to the opening 5 when their individuality is correctly defined by the letter-registry at the holes 27, 28 and 29. And because of these defective combinations that may be made with the letters provided, the indexing of the letters C A T will impress upon the mind of a child that C A T has a fixed relation to the picture of the cat, because no other combination will bring the picture of the cat into view.

Were the three cylinders 20, 21 and 22 of uniform diameter and the lower edges of all the levers 16 straight to bear against the top faces of all three cylinders, the downward drop of a lever at the cylinder furthest from the pivot of the lever would require a depth of slot that would cut more than half way through the cylinder and weaken its structure, especially if two adjoining slots should be positioned diametrically opposite. To overcome this structural trouble, the middle cylinder 21 has a diameter smaller than the diameters of the two adjoining cylinders 20 and 22 and to provide that the lower edges of the levers 16 shall contact with all three cylinders in the manner previously described, the lower edges of the levers are formed with a convex curvature and through this arrangement depth of the slot for the free ends of the levers is reduced to about one half of what would be required for a lever having a straight lower edge.

Figure 8:
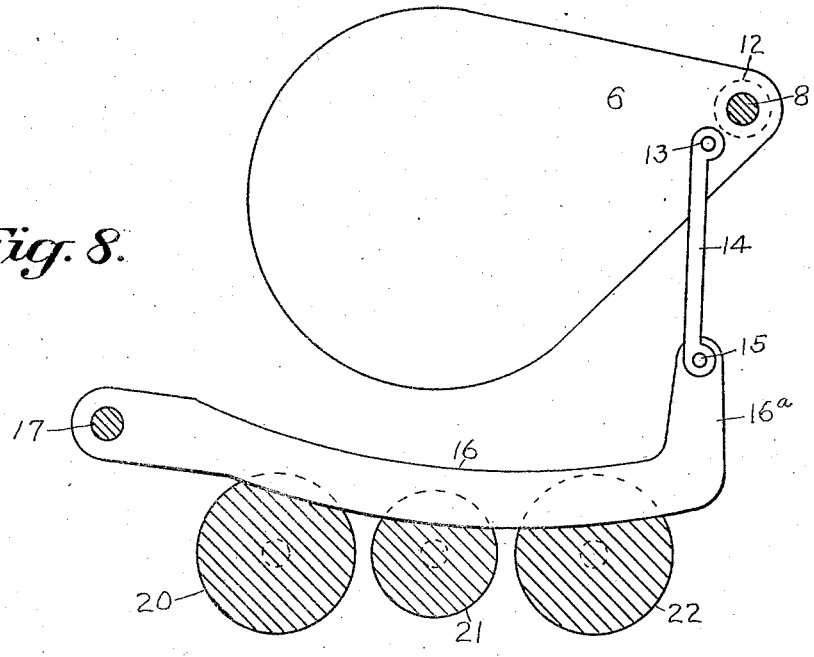
Figure 8, is a diagrammatic view showing the relative position of the several parts when a target is exposed.

Referring to Figure 8, where the lever 16 is shown in operative position within the slots in all three cylinders and its associated target lowered to the exposed position, the cylinder 20 which is nearest the lever's pivot 17 has a comparatively shallow slot; the slot in the cylinder 21 is a little deeper and the slot in the cylinder 22 is deeper still. All the slots in the three cylinders that co-operate with the five levers 16 that are pivoted at the left hand side of the case, will have this same arrangement in all three cylinders. For the five levers that are pivoted at the right hand side of the case, the relative depth of the slots in the three cylinders will be reversed; the shallow slot shown for the cylinder 20 in this figure, will be transferred to the cylinder 22 and the deeper slot in the cylinder 22 will be transferred to the cylinder 20; and as both series of levers are spaced on their respective pivots to overhang the three cylinders in a staggered relation, the adjoining slots in the two cylinders 20 and 22 will be alternately shallow and deep but the slots in the cylinder 21 will be more uniformly alike.

To effectively close in the whole mechanism within the case the two openings 5 may be provided with a glass or celluloid covering 31 secured to the inside faces of the two walls 1 and 2.

In the preferred form for the case, a base of wood is provided and to complete the construction, a suitable cardboard box should be a part of the commercial outfit. This box container is a necessary extra expense to protect the educational device from injury and at the same time give a shape that can be closely packed up for shipment. To eliminate this extra box, forms the subject matter of the modification shown in a reduced scale at Figure 10, where the front and back pieces 1ª and 2ª are similar to those in the preferred construction. The bottom piece 4ª may be a continuation of 3ª that passes around all four sides of the case. The piece 3ª, however, is enough wider than that shown at Figure 2, to extend beyond the front wall 1ª and a little beyond the face of the finger knob 25. This provides for a box-like structure having a set-in front wall 1ª, and the front open face may be covered by a cardboard cover 32, making a complete shipping unit with the addition of only a cover piece.

While the invention as now described comprises a series of three-letter objects that are disclosed through the manipulation of a three position index, it will be understood that four or more lettered objects can be provided for by simple reproduction of these described parts; that providing an opening 5 at the rear wall of the case, not only admits more light to the interior of the case, but by duplicating the pictures on each side of the targets, the pictures may be viewed from both front and back.

Having fully described the nature of my invention, I desire to secure the same by Letters Patent and therefore claim:

1. The combination with a casing having an opening, of a target normally hidden from view but arranged to move to the opening, and a series of rotatable selectively operable elements jointly controlling the presentation of the target to the opening.

2. The combination with a casing having an opening, of a series of normally invisible targets arranged to move to the opening one at a time, and a series of rotatable selectively operable elements arranged to jointly control the movement of any target.

3. The combination with a casing having an opening, of a series of targets normally hidden from view but arranged to be presented to the opening, a series of rotatable selectively operable elements, and means to control the presentation of any target to the opening through a variable setting of the selective elements.

4. The combination with a casing having an opening, of a target normally hidden from view but arranged to be presented to the opening, and a series of rotatable selectively operable elements arranged to jointly cause the target to appear or disappear at the opening.

5. The combination with a casing having an opening, of a series of targets normally hidden from view but arranged to be presented to the opening, and a series of rotatable selectively operable elements arranged to jointly cause any target to appear or disappear from the opening.

6. In an educational device, the combination with a casing having an opening, of a pictured target normally hidden from view but adapted to move to the opening to expose the picture and a series of rotatable selectively operable elements adapted and arranged to expose the picture when set in proper sequence.

7. In an educational device, the combination with a casing having an opening, of a series of pictured targets normally hidden from view but arranged to be presented to the opening to expose each picture, and a series of rotatable selectively operable lettered disks arranged to jointly control the exposure of any picture, when the selective elements are set to spell the picture.

8. In an educational device, the combination with a casing having an opening, of a pictured target normally hidden from view but arranged to be presented to the opening to expose the picture, and a series of rotatable selectively operable lettered elements arranged to expose the picture when the setting of the selective elements spells the picture.

9. In an educational device, the combination with a casing having a central opening, of two or more series of pictured targets normally hidden from view but arranged to be individually presented to the opening to expose a picture, and a series of rotatable selectively operable lettered disks arranged to jointly control the exposure of any picture of any series, when the selective elements are set to spell a picture.

10. In an educational device, the combination with a casing having an opening, of a series of pictured targets normally hidden from view but adapted to move to the opening, and rotatable selectively operable means whereby any target of the series may be selected for exposure through the proper registry of the selective means.

11. In an educational device, the combination with a casing having an opening, of a series of pictured targets normally hidden from view but adapted to move to the opening and a series of rotatable lettered disks provided with means whereby each target will respond to a predetermined registry of the letters that spell the picture on the target.

12. In an educational device, the combination with a casing having an opening, of a series of pictured targets normally hidden from view but adapted to move to the opening to expose the pictures and a series of rotatable lettered indexes adapted to expose those letters that spell a picture and automatically expose the associated picture at the opening.

13. In an educational device, the combination with a casing having an opening, of a pictured target normally hidden from view but arranged to present the picture to the opening, selective devices including a series of rotatable lettered discs, and means co-operative with the selective devices and connected to the target, whereby the picture will be exposed when the letters spell the picture.

14. In an educational device, the combination with a casing having an opening, of a series of pictured targets normally hidden from view but arranged to be individually presented to the opening, rotatable selectively-operable means including discs having a series of letters, and means co-operative with the exposure of the letters and effective to expose any picture of the series when the letters disclosed, spell the picture.

15. In an educational device, the combination with a casing having an opening, of a pictured target normally hidden from view, a series of interlocks to control the target and rotatable selectively operable means adapted to register a predetermined setting for the interlocks that will release the target.

16. In an educational device, the combination with a casing having an opening, of a pictured target normally hidden from view, a series of interlocking members to control the target, and rotatable selectively operable devices arranged to present a predetermined setting for the interlocks that will release the target to expose the picture.

17. In an educational device, the combination with a casing having an opening, of a pictured target normally hidden from view, a series of interlocking elements to control the target, and a series of selectively-operable rotatable lettered members arranged to register the letters that spell the picture and automatically expose the picture.

18. In an educational device, the combination with a casing having an opening, of a pictured target normally hidden from view, a lever connected to the target, a cylinder having a slot within the field of the lever and a visible index adapted to bring the slot and lever into co-operation at a predetermined point to expose the target.

19. In an educational device, the combination with a casing having an opening, of a pictured target normally hidden from view, a lever connected to the target, a series of cylinders having slots adapted for alinement with the lever and a visible index for each cylinder adapted to register the positions where all three slots will co-operate with the lever to expose the target.

20. In an educational device, the combination with a casing having an opening, of a plurality of pictured targets normally hidden from view, a lever connected to each target, a series of cylinders having slots adapted for alinement with each lever and a visible index for each cylinder to register the relation of the slots.

21. In an educational device, the combination with a casing having an opening, of a plurality of pictured targets normally hidden from view, a lever connected to each target, a series of cylinders having slots to co-operate with each lever and a lettered index for each cylinder adapted to bring a series of slots into co-operation with any lever when the registry of the letters spells the picture.

22. In an educational device, the combination with a casing having an opening, of a plurality of invisible pictured targets arranged to move to the opening to expose a picture, a series of rotatable selective members including discs having letters to spell any picture on the targets, and means operated by the selective members and connected to the targets whereby the spelling of the picture by the exposure of the letters will automatically expose the picture.

23. In an educational device, the combination with a casing having an opening, of a plurality of invisible pictured targets adapted to move to the opening by gravity, a series of interlocks to control each target and a series of lettered disks comprising indexes adapted to automatically release any interlock when the letters on the dials register to spell a picture.

24. In an educational device, the combination with a casing having an opening, of a target overhanging the opening and arranged to drop to the opening by gravity, interlocks to control the target, and rotatable selectively-operable means arranged to release the interlocks and allow the target to drop to the opening.

25. In an educational device, the combination with a casing having an opening, of a target adapted to swing to and from the opening, a lever connected to the target, a cylinder having a slot to co-operate with the lever within the casing and exterior means to register the position when the said slot and lever coact to move the target.

26. In an educational device, the combination with a casing having an opening, of a target adapted to swing to and from the opening, a lever connected to the target, a series of slotted cylinders to co-operate with the lever within the casing and exterior means to register the position of each cylinder where the slots and lever are in alinement to move the target.

27. In an educational device, the combination with a casing having an opening, of a pictured target adapted to swing to and from the opening, a lever connected to the target, a series of cylinders having slots positioned to co-operate with the lever within the casing and an exterior registry for each cylinder to define a position when all the slots are in alinement with the lever to move the target.

28. In an educational device, the combination with a casing having an opening, of a normally invisible pictured target adapted to swing to and from the opening, a series of invisible lettered members provided with registry holes in the casing to expose one letter at a time and means co-operative with the movement of the dials to expose the picture at the opening when the exposed letters spell the picture.

29. In an educational device, the combination with a casing having an opening, of a target adapted to swing to and from the opening, a lever connected to the target, a plurality of slotted cylinders of varying diameters to co-operate with the lever and an index adapted to define the relation of the slots to the lever.

30. In an educational device, the combination with a casing having an opening, of a pictured target adapted to swing to and from the opening, a pivoted horizontal lever connected to the target, a plurality of rotatable cylinders in contact with the lever, a transverse slot in each cylinder positioned to aline with the lever and an index rotated with each cylinder to define the operative positions of the slots to the lever so that the picture may be exposed at the opening.

31. In an educational device, the combination with a casing having an opening, of a target normally hidden from view, and rotatable selective members arranged to jointly expose the target at the opening and individually operable to restore the target to its hidden position.

32. In an educational device, the combination with a casing having an opening, of a pictured target normally hidden from view by the casing, and rotatable selectively-operable lettered members arranged by the proper selection of the letters to effect a joint target-releasing operation and individually operable to restore the released target.

HERBERT H. STEELE.